US005429179A

United States Patent [19]
Klausing

[11] Patent Number: 5,429,179
[45] Date of Patent: Jul. 4, 1995

[54] GAS ENGINE DRIVEN HEAT PUMP SYSTEM HAVING INTEGRATED HEAT RECOVERY AND AUXILIARY COMPONENTS

[75] Inventor: Thomas A. Klausing, Powell, Ohio

[73] Assignee: Gas Research Institute, Chicago, Ill.

[21] Appl. No.: 109,912

[22] Filed: Aug. 23, 1993

[51] Int. Cl.⁶ .................................. F25B 29/00
[52] U.S. Cl. ...................... 165/29; 62/238.7; 62/323.1; 165/48.1; 237/2 B
[58] Field of Search ............ 165/29, 48.1; 62/238.6, 62/238.7, 323.1; 237/2 B

[56] References Cited

U.S. PATENT DOCUMENTS

| | | | |
|---|---|---|---|
| 4,112,705 | 9/1978 | Sisk | 165/29 |
| 4,179,901 | 12/1979 | Fiala et al. | 62/238 |
| 4,293,092 | 10/1981 | Hatz et al. | 237/12.1 |
| 4,346,755 | 8/1982 | Alley | 165/29 |
| 4,553,401 | 11/1985 | Fisher | 237/2 B |
| 4,569,207 | 2/1986 | James | 62/238.6 |
| 4,614,090 | 9/1986 | Kaneko | 62/238.6 |
| 4,697,434 | 10/1987 | Yuyama | 62/238.7 |
| 4,805,689 | 2/1989 | Inada et al. | 165/29 |
| 4,852,366 | 8/1989 | Harris | 62/238.6 |
| 4,907,738 | 3/1990 | Harris | 237/2 B |
| 4,910,969 | 3/1990 | Dalin et al. | 62/238.6 |
| 4,976,464 | 12/1990 | Swenson | 237/81 |

FOREIGN PATENT DOCUMENTS

| | | |
|---|---|---|
| 2085825 | 8/1979 | Germany . |
| 3014029 | 10/1981 | Germany . |
| 3102302 | 8/1982 | Germany . |

Primary Examiner—Ira S. Lazarus
Assistant Examiner—Daniel J. O'Connor
Attorney, Agent, or Firm—Watkins, Dunbar & Pollick

[57] ABSTRACT

In a combustion engine driven refrigerant vapor compression heat pump system, an integrated heat exchanger is provided which recovers and uses waste heat from the combustion engine coolant and exhaust stream, further produces auxiliary heat when the heat pump system is operating in the heating mode of operation, and uses some of the same components to cool the combustion engine coolant when the heat pump system is operating in the cooling mode of operation. Additional features are integrated into the heat exchanger to provide engine oil cooling and heating.

19 Claims, 4 Drawing Sheets

GAS ENGINE DRIVEN HEAT PUMP SYSTEM HAVING INTEGRATED HEAT RECOVERY AND AUXILIARY COMPONENTS

BACKGROUND OF THE INVENTION

The present invention relates to refrigerant vapor compression heat pump systems that are driven by combustion engine prime movers. More particularly, it relates to the integration of heat recovery, engine cooling, engine oil warming, engine oil cooling, and auxiliary heating functions in one space and cost saving device.

Vapor compression heat pumps are widely used to provide heating and cooling air conditioning in residential service. While the predominant motive power for such heat pump systems has been electric motor drive means, combustion engines are attractive alternative sources of motive power for such systems, and have been used in such settings.

One drawback of vapor compression heat pump systems has been that during winter operation the heating capacity decreases as the ambient temperature of the outside air, being used as a source of heat, goes down. At the same time, building heat losses increase, and under some conditions the temperature of the inside living space decreases unless some additional source of heat is available. A common solution to the problem has been the provision of auxiliary electric heaters to meet the requirements of the total heating load during severe outside temperature and weather conditions.

One of the advantages of using a combustion engine heat pump system is the excess heat of combustion generated in the engine which is available for wintertime heating augmentation. This reduces the requirement for auxiliary heaters. Thus, it is a common practice in combustion engine heat pump systems to recover the unused, excess heat from the engine by conveying a working fluid such as water with an ethylene glycol antifreeze through the cooling system of the engine and also through an exhaust gas heat exchanger where waste heat from the engine is exchanged with the working fluid. The working fluid is then conveyed or pumped to another heat exchanger or radiator that is located in the air flow in the air conditioned building. Where more severe weather requires further heat input, a separate auxiliary heater can be used to further heat the working fluid or air flow. One such system is shown, for example, in U.S. Pat. No. 5,003,788, to Fischer. In the '788 patent, in less severe weather conditions or in the cooling mode, the working fluid is conveyed to a hot water tank to heat water for domestic hot water service, and during the cooling mode, is further conveyed to an outdoor heat exchanger to reject heat to the atmosphere.

While the advantages of using waste heat from combustion engine driven heat pump systems is well recognized, the wide range of options for recovery and use of waste heat, such as disclosed in the '788 patent, has required numerous separate components for heat exchange, auxiliary heating and heat rejection to inside or environmental air flows. The complexity, size and cost of the heat pump systems having desirable heat recovery and use capabilities have increased accordingly.

Accordingly, the need exists for heat pump systems which recover and apply this heat in one space and cost saving device performing all recovery and auxiliary heating functions for combustion engine driven refrigerant vapor compression heat pump systems.

SUMMARY OF THE INVENTION

The present invention satisfies that need with an apparatus which integrates waste heat recovery and use with auxiliary heating and other functions in one space and cost saving device for use in a heating and cooling heat pump system powered by a gas fueled combustion engine. The apparatus is an integrated heat exchanger having a main tank to receive working fluid coolant from the combustion engine, a recuperator heat exchanger circuit in heat exchange relation with the first working fluid to recover heat from the combustion engine exhaust stream, and a means for auxiliary heating in heat exchange relation with the first working fluid to intermittently produce and transfer auxiliary heat to the first working fluid in the heating mode of operation.

Further, in the preferred embodiment, the means for auxiliary heating is also selectively operable in a non-combustion mode as a means for cooling the working fluid coolant from the engine when the heat pump system is in the cooling mode of operation. As well, an engine oil heat exchanger is further integrated into the device to provide heating and cooling of engine oil.

Thus, in accordance with the present invention, previously separated functions are integrated into one device, wherein at least one feature of the integrated device serves in a dual role, depending on whether the heat pump system operating is in the heating mode or the cooling mode, for the purpose of reducing the size and cost of gas engine driven heat pump systems.

The foregoing and other advantages of the invention will become apparent from the following disclosure in which the preferred embodiment of the invention is described in detail and illustrated in the accompanying drawings. It is contemplated that variations in the procedure, structural features and arrangement of parts may appear to those skilled in the art without departing from the scope or sacrificing any of the advantages of the invention.

Figure 1:
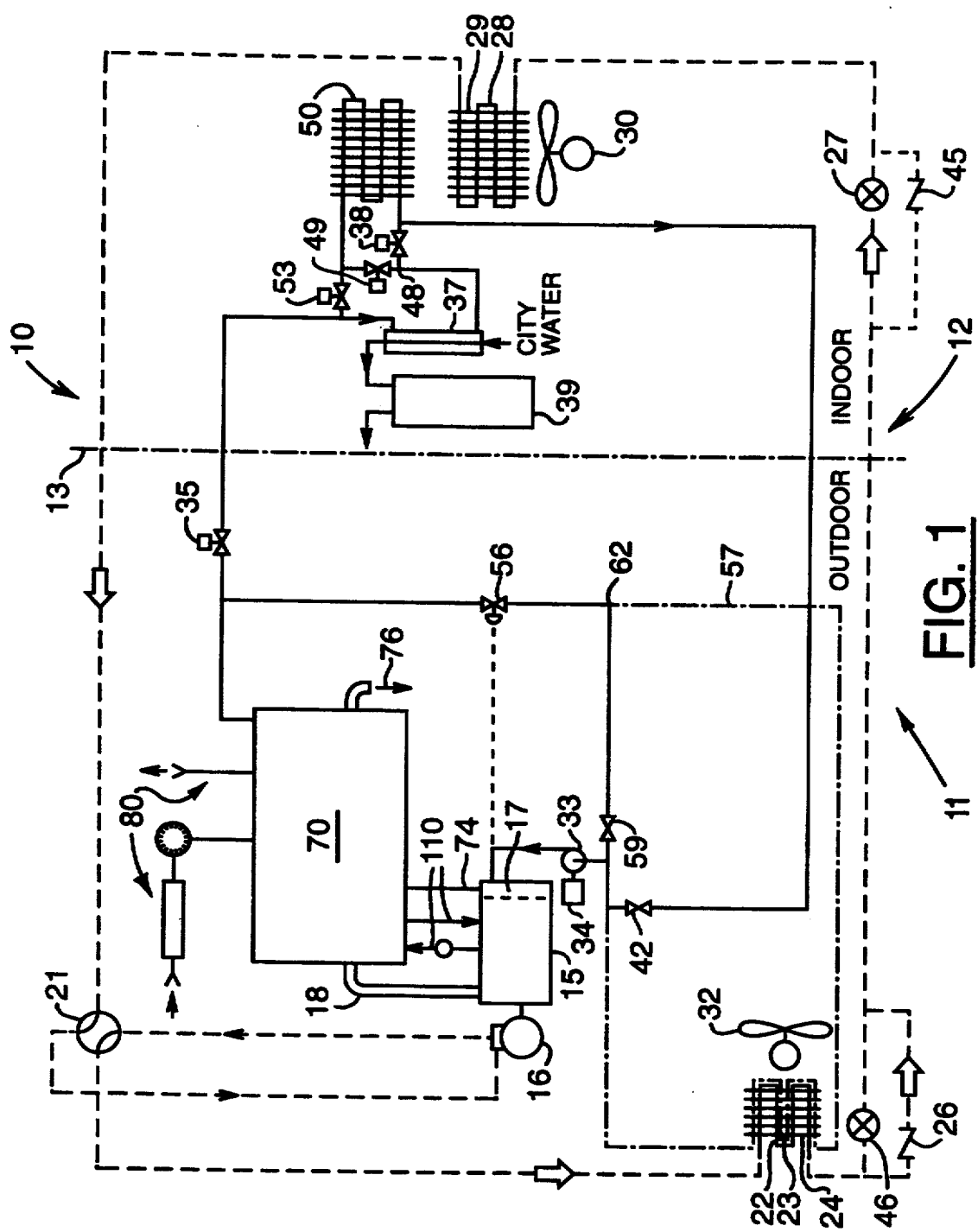
FIG. 1 is a schematic diagram of the apparatus of the present invention in an illustrative heat pump system.

In the following description of the preferred embodiment of the invention which is illustrated in the drawings, specific terminology is used for the sake of clarity. However, it is not intended that the invention be limited to the specific terms so selected or the system so shown and it is to be understood that each specific term includes all technical equivalents which operate in a similar manner to accomplish a similar purpose.

DETAILED DESCRIPTION OF THE PREFERRED EMBODIMENTS

Referring to FIG. 1, the system, referred to generally as 10 includes an outdoor portion 11 and an indoor portion 12, those components being schematically divided by the line 13. The operation of the system 10, generally, in the cooling and heating modes of operation are set forth in detail in U.S. Pat. No. 5,003,788, Fischer, issued Apr. 2, 1991, and incorporated by reference herein.

In pertinent part, the heat pump system 10 of FIG. 1 may be understood to include an internal combustion engine 15 mechanically connected to a refrigerant vapor compressor 16. The engine 15 includes a cooling fluid jacket 17 and an exhaust pipe means 18 which separately convey engine working fluid and combustion exhaust gases, respectively, to the integrated heat exchanger 70 of the present invention. Means 80 for auxiliary heating (shown in greater detail in FIGS. 2A–6) are further incorporated into the integrated heat exchanger 70. As may be further understood from FIG. 1, engine working fluid, also referred to as first working fluid 74, is indicated by solid lines, and refrigerant is shown by dashed lines. Indoor heat exchanger 50 is provided for the first working fluid for the heating mode of operation.

First working fluid 74 may also be used in many other alternative ways to provide heat to other loads. Two alternatives are illustratively shown in FIG. 1. In one, a conduit 57 (shown in dash-dot line) is provided to warm heat exchanger 22 during the defrosting mode of operation. Also illustratively shown in FIG. 1, a hot water tank 39 is provided to receive water heated by the first working fluid 74 in either mode, as available. Other uses may include, for example, heating outdoor tubs and pools (not shown). Appropriate positioning of valves 35, 38, 42, 49, 51, 53, 56 and 59 is understood as necessary to bring these optional system components on-line or off-line, as needed, in pertinent modes of operation as described in greater detail in the '788 patent, incorporated by reference herein. While shown for purposes of illustration, conduit 57 and the tank 39 are not preferred, and no attempt is made to limit the present invention to systems including such components.

Briefly, the modes of heat pump operation include heating modes of operation, i.e. low ambient heating mode (e.g. where ambient outdoor temperatures are below 25° Fahrenheit (F.)) and warm ambient heating mode (e.g. where ambient outdoor temperatures are from 25° to 60° F.), a cooling mode of operation, and a defrosting mode where the evaporator (i.e. heat exchanger 22) of the heat pump system 10 is defrosted. Operation of the heat pump refrigeration components 21–24, 26–30, 32 and 45 described in the '788 patent for the various modes of operation, while instructive, is not essential to an understanding of the present invention.

Figure 2A:
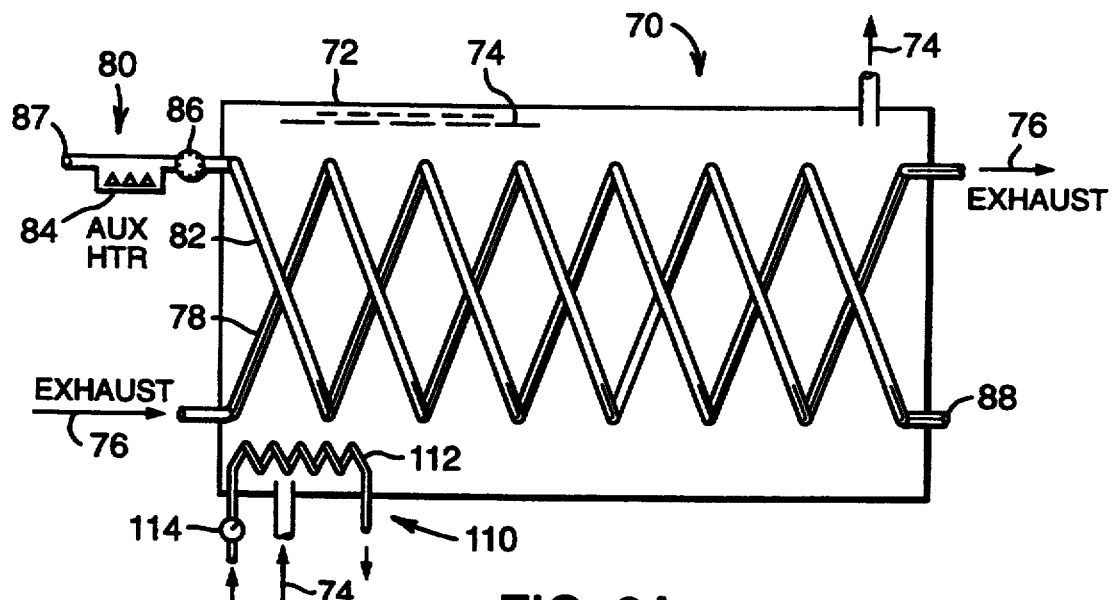
FIG. 2A is a schematic diagram of the apparatus of the present invention in the preferred embodiment wherein the means for auxiliary heating circulates heated gases.

Referring now to FIG. 2A, the integrated heat exchanger 70 of the present invention is shown in a preferred embodiment which integrates waste heat recovery and use with auxiliary heating and other functions in one space and cost saving device for use in a heating and cooling air conditioning heat pump system 10 powered by the gas fueled combustion engine 15. The integrated heat exchanger 70 schematically shown includes a main tank 72 to receive first working fluid 74 from the combustion engine 15, a recuperator heat exchanger circuit 78 in heat exchange relation with the first working fluid 74 to recover heat from the combustion engine exhaust stream 76, and a means 80 for auxiliary heating in heat exchange relation with the first working fluid 74 to intermittently produce and transfer auxiliary heat, as needed, to the first working fluid 74 in the heating mode of operation.

It is preferred that the means 80 for auxiliary heating is also selectively operable as a means for cooling the first working fluid 74 from the engine, as for example, when the heat pump system 10 is in the cooling mode of operation. As well, at least a portion of the means 80 for auxiliary heating is disposed in the main tank 72 in heat exchange relationship with the first working fluid 74 to facilitate heating or cooling thereof. Finally, it is further preferred to integrate an engine oil heat exchanger 110 into the device of the present invention to provide heating and cooling of engine oil to maintain oil temperatures at levels consistent with desired engine operating temperatures.

Still referring to FIG. 2A, the means 80 for auxiliary heating preferably includes an auxiliary heat exchanger circuit 82 disposed in the main tank 72 in heat exchange relationship with the first working fluid 74 for auxiliary heating of the first working fluid 74 in the heating mode of operation, and cooling of the first working fluid 74 in the cooling mode of operation. The means 80 for auxiliary heating further includes a means 84 for heating gases, such as an in-line gas burner, for production of hot gases for circulation through the auxiliary heat exchanger circuit 82 when the heat pump is operating in the heating mode of operation. The means 80 for auxiliary heating also includes a means 86 for circulating gases through the auxiliary heat exchanger circuit 82, such as a blower. Means 86 for circulating gases circulates heated gases such as combustion products and heated air in the heating mode, and circulates cool ambient air through the auxiliary heat exchanger circuit 82 in the cooling mode. By way of illustration, and not limitation, the auxiliary heat exchanger circuit 82 in its simplest and preferred form is an open circuit receiving air at a first end 87, and exhausting heated air and heated gases at a second end 88 in the heating mode, or exhausting air only in the cooling mode.

In FIGS. 2A–6, the first working fluid 74 is representatively shown entering and exiting the integrated heat exchanger 70 in generally the same direction as the exhaust stream 76 and/or the fluid flow through the means 80 for auxiliary heating. It is understood that this is representative, and that the first working fluid 74 may be in counter-flow relationship with one or more of the other liquids or gases which circulate through the integrated heat exchanger 70.

Figure 2B:
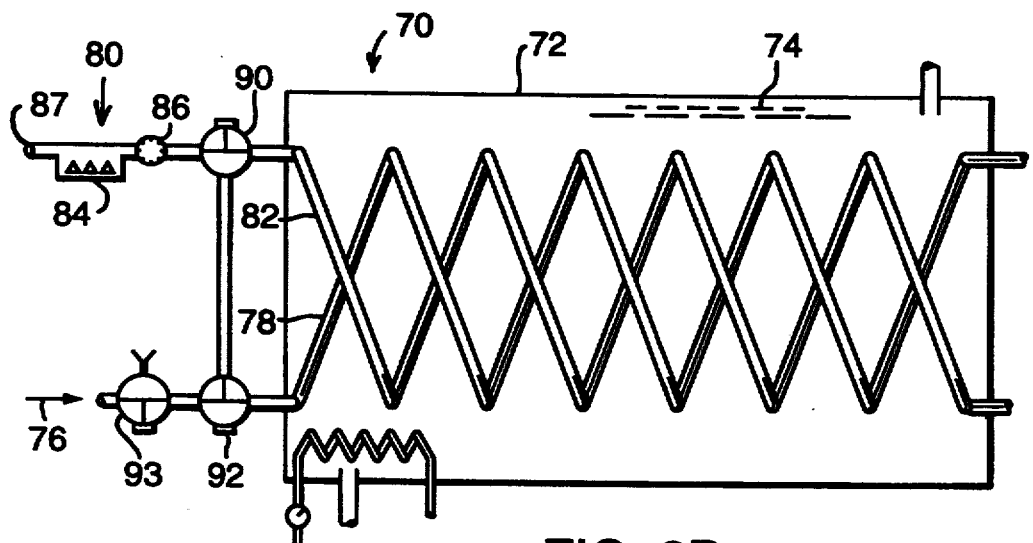
FIG. 2B is a schematic diagram of an alternative embodiment of FIG. 2A.

As further shown in FIG. 2B, the recuperator heat exchanger circuit 78 and auxiliary heat exchanger circuit 82, which are in parallel, can be interconnected in accordance with the present invention to facilitate heating and cooling of the engine working fluid. However, such interconnection is not preferred for reasons of cost, complexity, and unreliability. Moreover, interconnection would be prohibited where there is simultaneous operation of the engine 15 and means 80 for auxiliary heating to prevent back-pressure problems. Nonetheless, interconnection or isolation of the circuits 78 and 82 is determined by selectively positioning valves 90 and 92 as may be understood from FIG. 2A.

For example, when the heat pump system 10 is operating in the low ambient heating mode, the valves are positioned to provide separate paths for the hot gases and exhaust stream 76, as is shown in FIG. 2B, to make efficient use of both heat sources. In the warm ambient heating mode, at times when the means 80 for auxiliary heating is not required, the valves 90, 92 may be positioned (e.g. repositioning valve 90 from the position shown) to permit the exhaust stream 76 to flow through both the auxiliary heat exchanger circuit 82 and the recuperator heat exchanger circuit 78 to maximize heat exchange with working fluid 74.

Similarly, still referring to FIG. 2B, in the cooling mode the exhaust stream 76 may be vented to the atmosphere through valve 93, while valves 90, 92 are positioned to circulate cool air by action of the means 86 for circulating through both the auxiliary heat exchanger circuit 82 and the recuperator heat exchanger circuit 78 to maximize cooling of working fluid 74. Depending on the amount of cooling required, the air flow normally provided by the means 86 for circulating for auxiliary heating purposes may or may not be sufficient to provide full cooling of the first working fluid 74 in the cooling mode. To provide full cooling, air flow may be increased, for example by providing means 86 for circulating as a two speed blower, with a higher speed for the cooling mode.

However, certain practical drawbacks outweigh some of the operating benefits of the embodiment of FIG. 2B. Because of the added cost and complexity of the valves 90, 92 and 93, the two speed blower, and a second muffler to receive exhaust diverted by valve 93, as well as reduced system reliability in operating the embodiment of FIG. 2B, the embodiment of FIG. 2A is preferred. Reduced system reliability results in FIG. 2B in part due to the effect of heat upon valves 90 and 92 which prevents complete shut-off and isolation of the heated gas stream and exhaust gas stream 76. As well, exhaust gases tend to be corrosive, and further effect valve life and reliability. It is sufficient, however, for purposes of the alternative embodiment of FIG. 2B, that the valves 90 and 92 act as diverter valves which, although not completely, substantially divert the two streams and substantially close the valves as desired.

Figure 3:
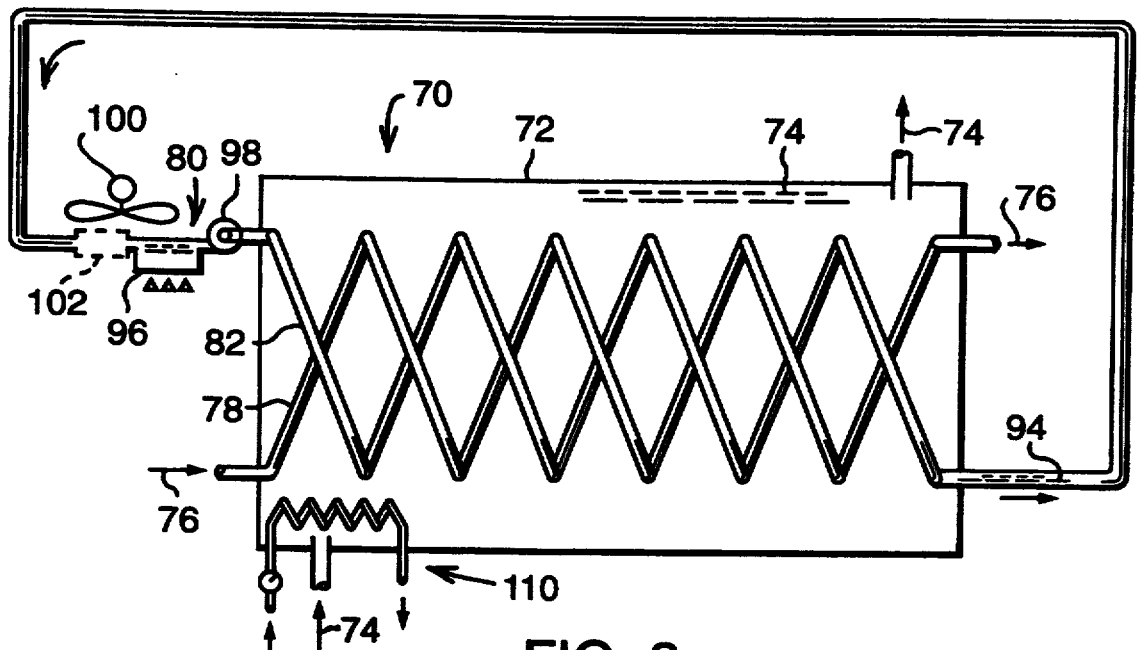
FIG. 3 is a schematic diagram of the apparatus of the present invention in an embodiment wherein the means for auxiliary heating circulates heated auxiliary working fluid.

Referring now to FIG. 3, the means 80 for auxiliary heating is shown to include an auxiliary working fluid 94 circulating through the auxiliary heat exchanger circuit 82 in a closed loop. In the heating mode of operation, the auxiliary working fluid 84 is heated by means 96 for heating auxiliary working fluid, and circulated by means 98 for pumping. In the cooling mode of operation, a fan 100 is provided which is selectively operable to produce a stream of air to cool the auxiliary working fluid 94 circulating through the closed loop and transfer heat to a heat sink, such as the atmosphere. Preferably the auxiliary working fluid 94 is either an ethylene glycol-water mixture or a propylene glycol-water mixture, and the means 96 for heating auxiliary working fluid is positioned in the stream of air so that when it is unfired its coils to provide ambient air cooling in the cooling mode of operation. Alternatively, although such is not preferred, a supplemental ambient air heat exchanger 102 (indicated in phantom), may be positioned in the stream of air to assist in cooling the auxiliary working fluid 94 in the cooling mode of operation.

Figure 4:
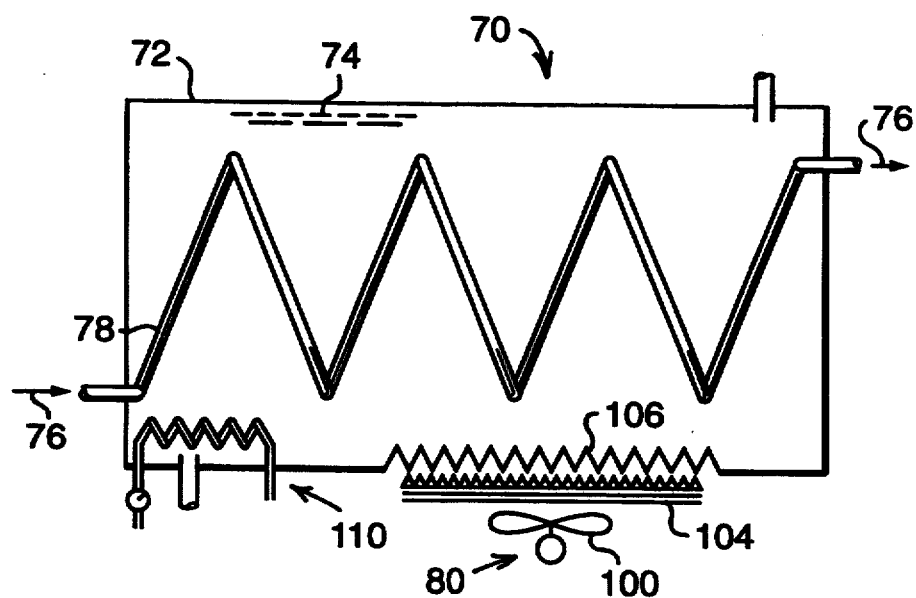
FIG. 4 is a schematic diagram of the apparatus of the present invention in an embodiment wherein auxiliary heat is provided directly to the main tank.

FIG. 4 further illustrates an alternative means 80 for auxiliary heating which includes means 104 for direct heating of the main tank 72, such as by an electric, or preferably, gas-fired heating element. In this embodiment, the means 80 for auxiliary heating is integrated, but to a lesser degree, into the entire structure of the apparatus, does not provide the same level of cooling in the cooling mode, and is less efficient. In this regard, it is possible to add fins or flutes 106 to the main tank 72 to increase the surface area for heat transfer. Cooling is provided in the cooling mode by a fan 100 blowing cooler ambient air across such fins or flutes.

Additional features may be further integrated into the apparatus of the present invention. As shown best in FIG. 2A, an engine oil cooler heat exchanger 110 is preferably integrated into the device of the present invention to provide heating and cooling of engine oil to maintain oil temperatures at levels consistent with desired engine operating temperatures. The engine oil cooler heat exchanger 110 includes an oil heat exchanger circuit 112 in heat exchange relationship with the first working fluid in the main tank 72, and oil pumping means 114 for circulating oil from the combustion engine through the oil heat exchanger circuit 112. While heating of the engine oil during initial engine cold starts is desirable, and oil cooling is desirable during periods of high ambient temperatures, typically, heating and cooling of the engine oil is conducted relative to the temperature of the water jacket so as to dampen variations in and equilibrate the oil temperature during steady state operation of the combustion engine 15, and to inhibit oil degradation caused by thermal cycling.

Figure 5:
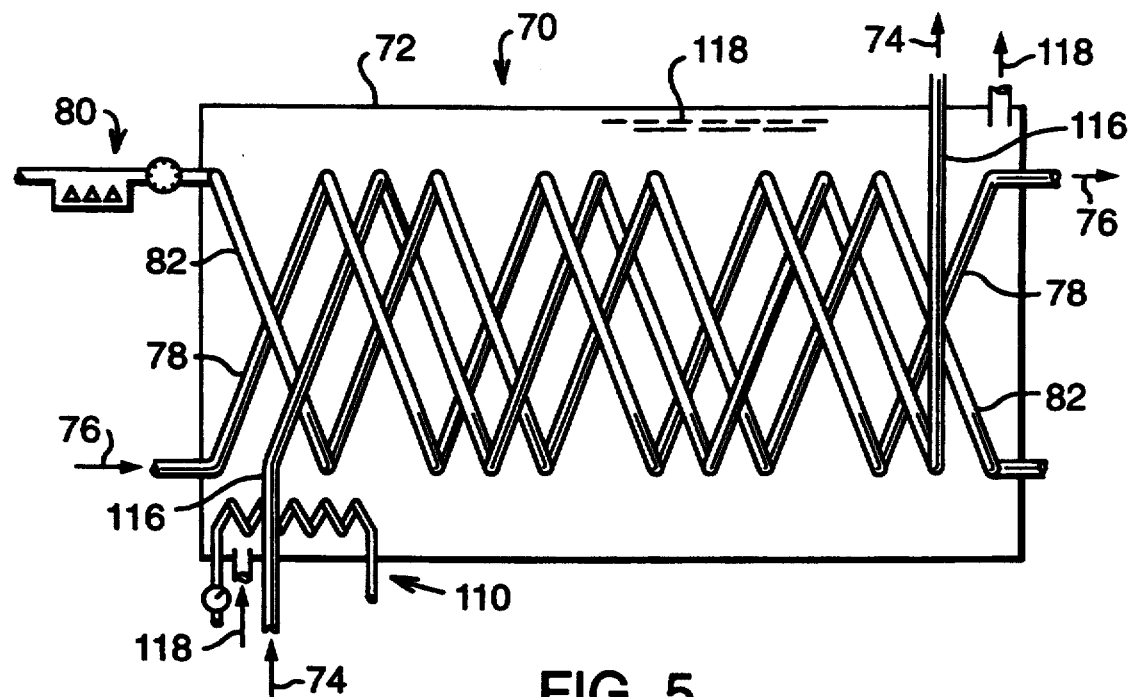
FIG. 5 is a schematic diagram of the present invention wherein the combustion engine working fluid circulates in a separate working fluid circuit through the main tank.
Figure 6:
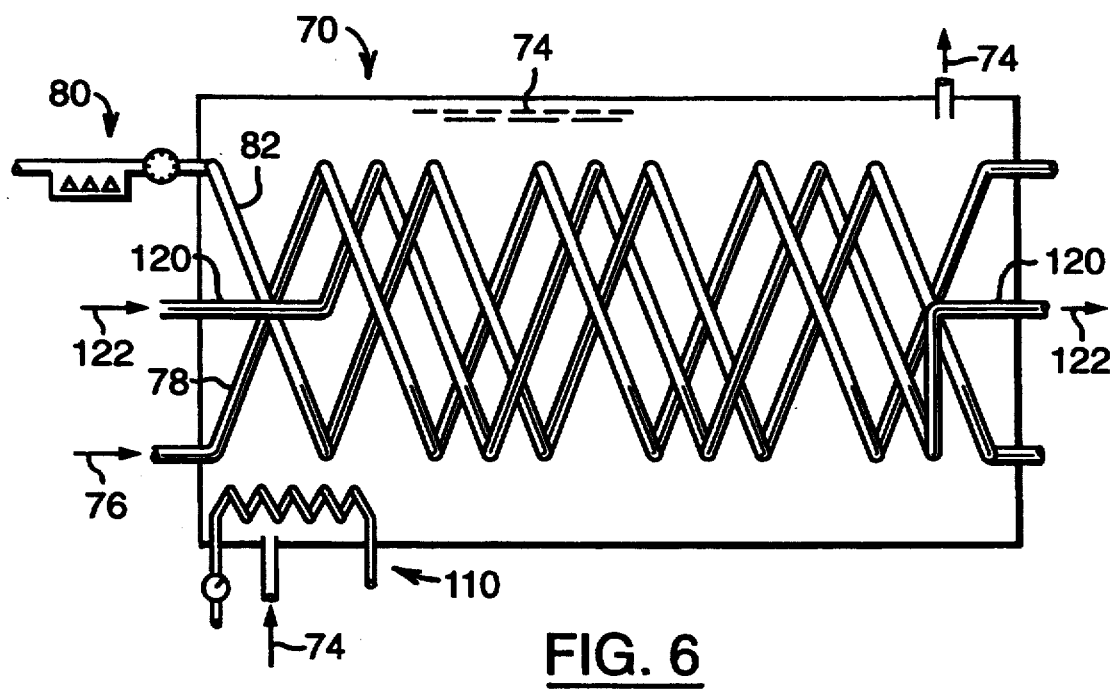
FIG. 6 is a schematic diagram of the present invention wherein the system includes a separate distribution circuit through the main tank to receive heat therein for use at a load.

Other features of the present invention shown in FIGS. 5 and 6 integrated into the heat exchanger 70 provide isolation of the first working fluid 74 from other working fluids 94, 122 which may be circulated to system loads. In FIG. 5, the first working fluid 74 is shown in a first working fluid circuit 116, with a main tank working fluid 118 acting as a heat transfer medium to receive heat from the first working fluid 74, exhaust stream 76, and the means 80 for auxiliary heating. In FIG. 5, the main tank working fluid 118, for example, ethylene glycol-water solution, may then be circulated to a load, such as an indoor heat exchanger 50 for heating spaces when the heat pump system 10 is operating in a heating mode, or a domestic hot water tank 39 when the heat pump system 10 is operating in a cooling mode, or warm ambient heating mode. In the alternative arrangement of FIG. 6, the first working fluid 74 is received in the main tank 72, and the main tank 72 includes a distribution heat exchanger circuit 120 in heat exchange relation with the first working fluid 74. A second working fluid 122 circulates through the distribution heat exchanger circuit 120 to receive and transfer heat from the first working fluid to a load, such as an inside heat exchanger 50 or domestic hot water tank 39, as previously described.

Regardless of the precise embodiment, where the main tank 72 contains a first working fluid 74 in the volume thereof, the volume of the main tank 72 is preferably sized with sufficient reserve capacity to supply heat to heat an indoor load when the heat pump system 10 is in the defrosting mode. As well, it is preferred to use, as needed, finned tubing for the various circuits 78, 82, 112, 116 and 120 passing through the main tank 72 to facilitate heat exchange in accordance with the present invention.

By way of example, in operation during a representative low ambient heating mode with outdoor ambient temperatures of 10° to 15° F., exhaust gas typically enters the recuperator heat exchanger circuit 78 at approximately 700° F., and means 80 for auxiliary heating produces heated gases and heated air at approximately 2000° F. First working fluid 74 typically enters the integrated heat exchanger 70 at approximately 175° F., and exits at approximately 220° F. for distribution to an indoor heat exchanger (e.g. indoor heat exchanger 50 to provide supplemental heat to living spaces). Oil temperatures should be maintained at approximately the inlet temperature of the first working fluid 74, e.g. approximately 180° F. This example is intended to illustrate the operation of the present invention in one mode of operation, and there is no intent to limit the scope of the present invention to the specific representative parameters set forth.

While certain representative embodiments and details have been shown for purposes of illustrating the invention, it will be apparent to those skilled in the art that various changes in the apparatus, method and article disclosed herein may be made without departing from the scope of the invention, which is defined in the appended claims.

What is claimed is:

1. A heat pump system selectively operable in cooling or heating modes of operation and connected with cooling or heating loads and a heat sink or source to selectively provide heat to or remove heat from the load, said heat pump system including:

an internal combustion engine prime mover for the heat pump system which produces excess heat for rejection; and an integrated heat exchanger to recover heat from said combustion engine and further produce auxiliary heat when said heat pump system is operating in the heating mode of operation, said integrated heat exchanger comprising:

a main tank to receive first working fluid coolant from said combustion engine;

a recuperator heat exchanger circuit disposed in said main tank in heat exchange relation with said first working fluid to receive exhaust gas from said combustion engine and transfer heat to said first working fluid; and a means for auxiliary heating disposed in heat exchange relationship with said first working fluid in said tank to intermittently produce and transfer auxiliary heat to said first working fluid in the heating mode of operation.

2. The heat pump system of claim 1 wherein said means for auxiliary heating is also selectably operable as a means for cooling the first working fluid to receive and reject heat recovered from said combustion engine, when said heat pump system is operating in the cooling mode of operation.

3. The heat pump system of claim 2 wherein said means for auxiliary heating includes:

an auxiliary heat exchanger circuit disposed in said main tank in heat exchange relationship with said first working fluid for auxiliary heating of said first working fluid in the heating mode of operation, and cooling of said first working fluid in the cooling mode of operation;

means for heating gases for circulation thereof through said auxiliary heat exchanger circuit when said heat pump is operating in the heating mode of operation; and means for circulating gases through said auxiliary heat exchanger circuit, said means for circulating operable to circulate heated gases through said auxiliary heat exchanger circuit in the heating mode, and air through said auxiliary heat exchanger circuit in the cooling mode.

4. The heat pump system of claim 3 wherein:

said means for heating gases comprises a gas burner;

said gases comprise air and combustion gases heated by said burner in said heating mode, and air only in said cooling mode; and said auxiliary heat exchanger circuit is an open circuit receiving air at a first end, exhausting air and heated gases at a second end in said heating mode, and exhausting air only in said cooling mode.

5. The heat pump system of claim 2 wherein said means for auxiliary heating includes:

an auxiliary heat exchanger circuit disposed in said main tank in heat exchange relationship with said first working fluid for auxiliary heating of said first working fluid in the heating mode of operation, and cooling of said first working fluid in the cooling mode of operation;

means for heating an auxiliary working fluid for circulation through said auxiliary heat exchanger circuit when said heat pump system is operating in the heating mode of operation;

means for pumping said auxiliary working fluid through said auxiliary heat exchanger circuit; and a fan selectively operable to produce a stream of air to cool the auxiliary working fluid circulating through said auxiliary heat exchanger circuit and transfer heat to a heat sink in the cooling mode of operation.

6. The heat pump system of claim 5 wherein said means for heating is an ambient air heat exchanger in said cooling mode of operation, and is positioned in said stream of air for cooling said auxiliary working fluid circulating therethrough, thereby cooling said first working fluid in heat exchange relationship therewith.

7. The heat pump system of claim 1 wherein said means for auxiliary heating comprises a gas fired heating element directly heating said main tank to transfer heat to said first working fluid.

8. The heat pump system of claim 1 wherein at least a portion of said means for auxiliary heating is disposed in said main tank in heat exchange relationship with said first working fluid.

9. The heat pump system of claim 1 wherein said means for auxiliary heating includes an auxiliary heat exchanger circuit disposed in said main tank in heat exchange relationship with said first working fluid to transfer auxiliary heat to said first working fluid in the heating mode of operation, and receive heat therefrom in the cooling mode of operation.

10. The heat pump system of claim 9 further comprising means for interconnecting said recuperator heat exchanger circuit and said auxiliary heat exchanger circuit, said means for interconnecting including at least one valve variably positionable to interconnect said circuits in parallel for flow of the same fluid in parallel circuits, and to separate said circuits to flow substantially separate fluids in said circuits.

11. The heat pump system of claim 1 further comprising an engine oil heat exchanger circuit in heat exchange relationship with said first working fluid, and pumping means for circulating oil from said combustion engine through said heat exchanger circuit.

12. The heat pump system of claim 11 wherein said means for auxiliary heating is selectably operable as a means for cooling the first working fluid to receive and reject heat recovered from said combustion engine, when said heat pump system is operating in the cooling mode of operation.

13. The heat pump system of claim 1 wherein said main tank includes:
- a working fluid circuit disposed therein to receive said first working fluid from said combustion engine; and
- further includes a main tank working fluid disposed in the volume of said main tank in heat exchange relation with said working fluid circuit, said recuperator heat exchanger circuit, and said means for auxiliary heating.

14. The heat pump system of claim 1 further including a distribution heat exchanger circuit to receive a second working fluid, said distribution heat exchanger circuit disposed in said main tank in heat exchange relation with at least said first working fluid to receive heat for distribution to a load.

15. The heat pump system of claim 14 wherein said distribution heat exchanger circuit is selectively connected to an inside load when the heat pump system is operating in the heating mode of operation, and to a domestic hot water tank when the heat pump system is in the cooling mode.

16. The heat pump system of claim 14 further comprising an oil heat exchanger circuit in heat exchange relationship with said first working fluid, and pumping means for circulating oil from said combustion engine through said heat exchanger circuit.

17. The heat pump system of claim 16 wherein said means for auxiliary heating is selectably operable as a means for cooling the first working fluid to receive and reject heat recovered from said combustion engine, when said heat pump system is operating in the cooling mode of operation.

18. The heat pump system of claim 1 wherein said main tank contains said first working fluid in the volume thereof, and said volume is sized with sufficient reserve capacity to supply heat to heat an inside load and when said heat pump system is in the defrosting mode.

19. A heat pump system selectively operable in cooling or heating modes of operation and connected with cooling or heating loads and a heat sink or source to selectively provide heat to or remove heat from the load, said heat pump system including:
- an internal combustion engine prime mover for the heat pump system which produces excess heat for rejection; and
- an integrated heat exchanger to recover heat from said combustion engine and further produce auxiliary heat when said heat pump system is operating in the heating mode of operation, said integrated heat exchanger comprising:
  - a main tank to receive first working fluid coolant from said combustion engine;
  - a recuperator heat exchanger circuit disposed in said main tank in heat exchange relation with said first working fluid to receive exhaust gas from said combustion engine and transfer heat to said first working fluid;
  - a means for auxiliary heating at least a portion of which is disposed in said main tank in heat exchange relationship with said first working fluid in said tank to intermittently produce and transfer auxiliary heat to said first working fluid in the heating mode of operation, said means for auxiliary heating also selectably operable as a means for cooling the first working fluid to receive and reject heat recovered from said combustion engine, when said heat pump system is operating in the cooling mode of operation; and
  - an oil heat exchanger circuit in heat exchange relationship with said first working fluid, and pumping means for circulating oil from said combustion engine through said heat exchanger circuit.

* * * * *